(12) United States Patent
Krause (10) Patent No.: US 10,889,039 B2
(45) Date of Patent: Jan. 12, 2021

(54) METHOD OF MANUFACTURING A MATERIAL STRAND

(71) Applicant: Cooper Standard GmbH, Linda/Bodensee (DE)

(72) Inventor: Fritz Krause, Hergatz (DE)

(73) Assignee: Cooper Standard GmbH, Lindau/Bodensee (DE)

( * ) Notice: Subject to any disclaimer, the term of this patent is extended or adjusted under 35 U.S.C. 154(b) by 0 days.

(21) Appl. No.: 16/071,847

(22) PCT Filed: Jan. 21, 2016

(86) PCT No.: PCT/EP2016/051231
§ 371 (c)(1),
(2) Date: Jul. 20, 2018

(87) PCT Pub. No.: WO2017/125156
PCT Pub. Date: Jul. 27, 2017

(65) Prior Publication Data
US 2019/0344489 A1 Nov. 14, 2019

(51) Int. Cl.
*B29C 48/00* (2019.01)
*B29C 48/92* (2019.01)
(Continued)

(52) U.S. Cl.
CPC ...... *B29C 48/0021* (2019.02); *B29C 48/0022* (2019.02); *B29C 48/0023* (2019.02);
(Continued)

(58) Field of Classification Search
CPC ............... B29P 19/047; B29P 2700/50; B29C 48/0021; B29C 48/0022; B29C 48/0023;
(Continued)

(56) References Cited

U.S. PATENT DOCUMENTS 6,725,123 B1 * 4/2004 Denuell ................. G01N 21/89
101/219
2016/0311297 A1 * 10/2016 Kast ..................... B23P 19/047

FOREIGN PATENT DOCUMENTS

DE 102005028069 A1 5/2006
DE 102006060391 A1 6/2008
(Continued)

OTHER PUBLICATIONS

International Search Report and Written Opinion for International Patent Application PCT/EP2016/051231 dated Mar. 6, 2016.

*Primary Examiner* — George R Koch
(74) *Attorney, Agent, or Firm* — Brian B. Shaw, Esq.; Harter Secrest & Emery LLP (57) ABSTRACT

A method of manufacturing a material strand (100), particularly for sealing, trimming or fastening of doors (11) or windows (12) of a motor vehicle (10), comprises the steps of: a) extrusion of an extruded strand (200); b) testing the extruded strand (200) after the extrusion, thereby identifying first segments (210) comprising manufacturing defects (211) and second segments (220) being free from manufacturing detects; c) cutting out the first segments (210) from the extruded strand (200), thereby causing faces (222) at the second segments (220); d) joining cut faces (222) of second segments (220) to obtain a joint (102) and to form a material strand (100), the joint (102) having a position within the material strand (100), wherein a minimum distance ($\Delta d$) is maintained between the positions of adjacent joints (102); e) identifying the position of each joint (102); and f) forming a transport unit (110) having a predetermined maximum length by winding the material strand (100).

20 Claims, 5 Drawing Sheets

(51) Int. Cl.
  *B29C 48/05* (2019.01)
  *B60J 10/23* (2016.01)
  *B60J 10/246* (2016.01)
  *B60J 10/248* (2016.01)
  *B23P 19/04* (2006.01)
  *B29L 31/30* (2006.01)

(52) U.S. Cl.
  CPC .............. *B29C 48/05* (2019.02); *B29C 48/92* (2019.02); *B23P 19/047* (2013.01); *B23P 2700/50* (2013.01); *B29C 2948/92295* (2019.02); *B29L 2031/302* (2013.01); *B60J 10/23* (2016.02); *B60J 10/246* (2016.02); *B60J 10/248* (2016.02)

(58) Field of Classification Search
  CPC ... B29C 48/92; B29C 66/52296; B29C 66/55; B29L 2031/302; B60J 10/23; B60J 10/246; B60J 10/248
  See application file for complete search history.

(56) References Cited

FOREIGN PATENT DOCUMENTS

| | | |
|---|---|---|
| DE | 102013114775 A1 | 6/2015 |
| EP | 1733839 A1 | 12/2006 |
| WO | 2014173499 A1 | 10/2014 |
| WO | 2015096880 A1 | 7/2015 |

\* cited by examiner

METHOD OF MANUFACTURING A MATERIAL STRAND

This application is a 371 of PCT/EP2016/051231, filing date Jan. 21, 2016.

The present invention relates to a method of manufacturing a material strand and to a material strand, particularly for sealing, trimming or fastening of doors or windows of a motor vehicle.

Material strands are, for example, wound onto a reel to form a transport unit at a supplier's production plant and unwound from the reel at an OEM's production plant in order to process the material strand. Such a transport unit including the material strand comes along with the advantage of providing for a cost-efficient and space-saving transport and storage. During the processing, the material strand is cut into pieces of a certain length so as to obtain a plurality of sealing strips or trim strips.

A method of forming seals is known from WO 2015/096880 A1. A material strand is divided into a plurality of sealing strand sections and the cross-section of each of the sealing strand sections differs along the longitudinal axis. During the processing of the material strand, the material strand is tested to detect possible manufacturing defects and to sort out those sealing strand sections which comprise the manufacturing defects.

From EP 1 733 839 B1, a method of forming seals is known, in which a material strand is tested before forming a transport unit as well as after the unwinding in order to detect possible manufacturing defects. Strand sections which comprise manufacturing defects are disposed as waste.

WO 2014/173499 A1 relates to a device for receiving an elastomer strand. The elastomer strand is wound around a roll having a horizontal axis and unwound from the roll before processing the strand. When the elastomer strand is unwound from the roll, the device can be folded up to save transport space.

The object of the invention is to improve material strands of prior art so as to be free from manufacturing defects before forming a transport unit and reduce material waste.

The object is achieved by a method of manufacturing a material strand according to claim 1, by a material strand according to claim 12 and by a transport unit according to claim 15. Advantageous embodiments of the method, of the material strand and of the transport unit are subject-matter of claims 2 to 11, 13 to 14 and 16 to 17, respectively.

The method of manufacturing a material strand according to the invention comprises the steps of:
  a) extrusion of an extruded strand;
  b) testing the extruded strand after the extrusion, thereby identifying first segments comprising manufacturing defects and second segments being free from manufacturing defects;
  c) cutting out the first segments from the extruded strand, thereby causing cut faces at the second segments;
  d) joining cut faces of second segments to obtain a joint and to form a material strand, the joint having a position within the material strand, wherein a minimum distance is maintained between the positions of adjacent joints;
  e) identifying the position of each joint; and
  f) forming a transport unit having a predetermined maximum length by winding the material strand.

Accordingly, the extruded strand is tested after the extrusion. Segments of the extruded strand comprising manufacturing defects, which are referred to as first segments, are then identified and cut out from the extruded strand. The second segments that are free from manufacturing defects are then joined at their cut faces so as to obtain a joint and to form a material strand of a certain length, a so-called endless material strand. Subsequently, a transport unit comprising the material strand is formed. Such a transport unit preferably comprises a reel. The transport and the storage of such a transport unit is space-saving and cost-efficient. Moreover, it can prevent the material strand from damage.

At the OEM's or processor's production plant, the joints need to be cut out before applying the strips to the window or to the door of an automotive vehicle. The position of each joint is therefore identified during the manufacturing of the material strand so that the OEM or processor will be able to cut out the joints without testing or examining the material strand.

Consequently, the outcome of the method described above is a material strand that comprises no manufacturing defects, wherein joints are not considered to be manufacturing defects. Thus, an OEM or another processor will receive a transport unit from the supplier without there being any need for him to detect manufacturing defects. Only joints must be detected if necessary.

According to the method, a minimum distance is to be maintained between the positions of adjacent joints. This is to ensure that the distance between those joints is long enough, on the one hand, to form a sealing strip or a trim strip. On the other hand, at the processor's production plant, the strip will most likely be applied by robots. When a certain minimum distance is not maintained between two adjacent joints, this generally leads to dead times for the robot and thus to non-productive times. By maintaining a minimum distance between adjacent joints, these non-productive times can be avoided.

At the same time, the waste of material is considerably reduced in comparison with methods of prior art due to the fact that only the first segments are wasted rather than entire sealing strips comprising manufacturing defects. In most cases, only a short segment will need to be cut out from the extruded strand. It is only necessary in few cases, namely if the distance between a cut face and the next manufacturing defect is less than the minimum distance between adjacent joints, to cut out a longer part from the extruded strand.

Preferably, the extruded strand is conveyed along a conveying direction, wherein in step b) the extruded strand is tested at a testing position along the conveying direction.

Preferably, in step c) the first segments are cut out at a stamping position, the stamping position being arranged along the conveying direction behind the testing position. Preferably, in step c) the first segments are cut out by stamping, wherein preferably a first stamping is performed prior to a first segment passing the stamping position and a second stamping is performed after the first segment has passed the stamping position. Alternatively, the first segments can be cut out by a saw or by a blade, for example.

By arranging the stamping position along the conveying direction behind the testing position, the first segments can be identified before the extruded strand reaches the stamping position. The first segments can then be cut out by stamping shortly before the first segment reaches the stamping position and shortly after the first segment has passed the stamping position. The first segments are disposed and only second segments remain for the manufacturing process.

Preferably, cut faces to be joined in step d) are formed so as to have complementary shapes, wherein preferably the cut faces have a stepped shape. This ensures that two cut faces are joined so as to have a corresponding orientation around their longitudinal axes.

Preferably, in step d) the second segments are joined by welding or sewing or adhering.

Preferably, in step e) the position of each joint is identified by a metal marker disposed at or near the cut faces of a joint or by a paint applied at or near the cut faces of the joint or by a radiocommunication member disposed at or near the cut faces of the joint or by a plastic marker disposed at or near the cut faces of a joint or by a metal seam. In particular, a metal seam can fulfil both the function of joining the second segments and the function of identifying the joint at the same time. Alternatively, in step e) the position of each joint can be identified by storing the position, wherein preferably the position is stored on a data storage medium. The identification of the joints enables an OEM or another processor of the material strand to know the position of each of the joints and to know where to cut out the joints.

Preferably, in step f) the transport unit of the material strand is formed by winding the material strand onto a reel. Usually, such a reel has a horizontal or a vertical axis. However, the material strand could, for example, also be stored in transport boxes or other transportation devices.

Preferably, the minimum distance is between about 5 m and about 15 m, preferably between about 8 m and about 12 m Preferably, the maximum length of the profile strand is between about 800 m and about 2000 m, preferably between about 1000 m and about 1600 m, most preferably about 1400 m.

In another aspect thereof, the invention relates to a material strand manufactured in accordance with the method described before, the material strand being free from manufacturing defects. A manufacturing defect may be any defect that occurs during manufacture of the strand, particularly an extrusion defect. Manufacturing defects usually lead to functional and/or optical impairments. Joints are not considered to be manufacturing defects for the purpose of the present invention.

Preferably, the material strand comprises at least one joint, preferably a plurality of joints, wherein the minimum distance is maintained between the positions of adjacent joints.

Preferably, in cross-section, the material strand comprises a function portion and a fastening portion, wherein preferably the function portion is a hollow chamber.

In another aspect thereof, the invention relates to a transport unit comprising at least one receiving device wherein each of the receiving devices comprises a reel. Preferably, the reel extends in a vertical direction.

Preferably, the receiving devices are stackable one onto another. This configuration of the transport unit comprising the at least one receiving device ensures that the transport of the material strand is space-saving and inexpensive.

In the following, the invention will be described in detail with reference to preferred embodiments, wherein.

Figure 1:
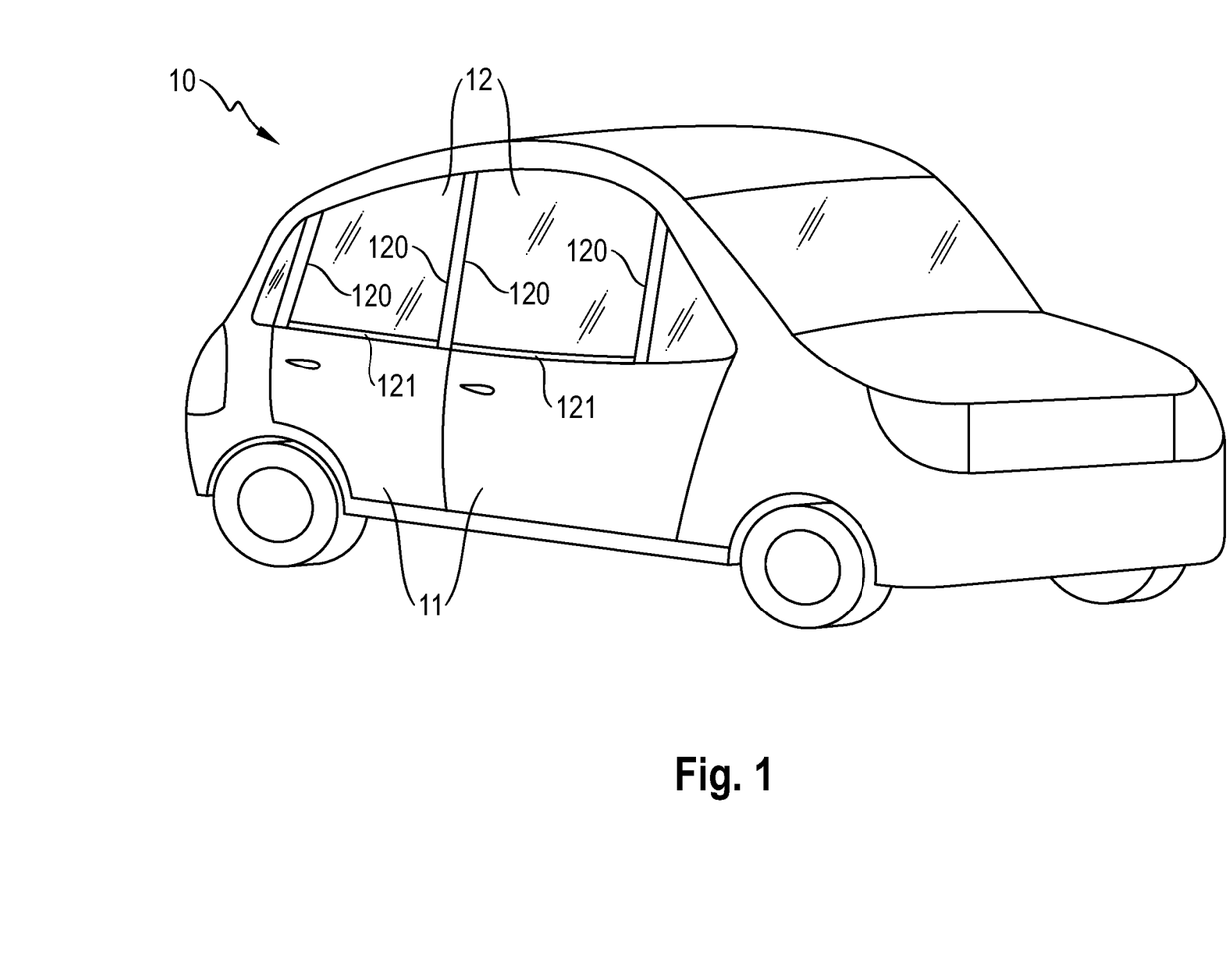
FIG. 1 shows an automotive vehicle with sealing strips manufactured in accordance with the method described herein.

Referring now to FIG. 1, it is shown an automotive vehicle 10. The automotive vehicle 10 has, at its doors and windows, sealing strips 120 and trim strips 121 that may be cut out from a material strand manufactured according to the method described herein. However, it is possible to manufacture most different types of material strands in accordance with the invention which do not necessarily have to find appliance in automotive industry.

Figure 2:
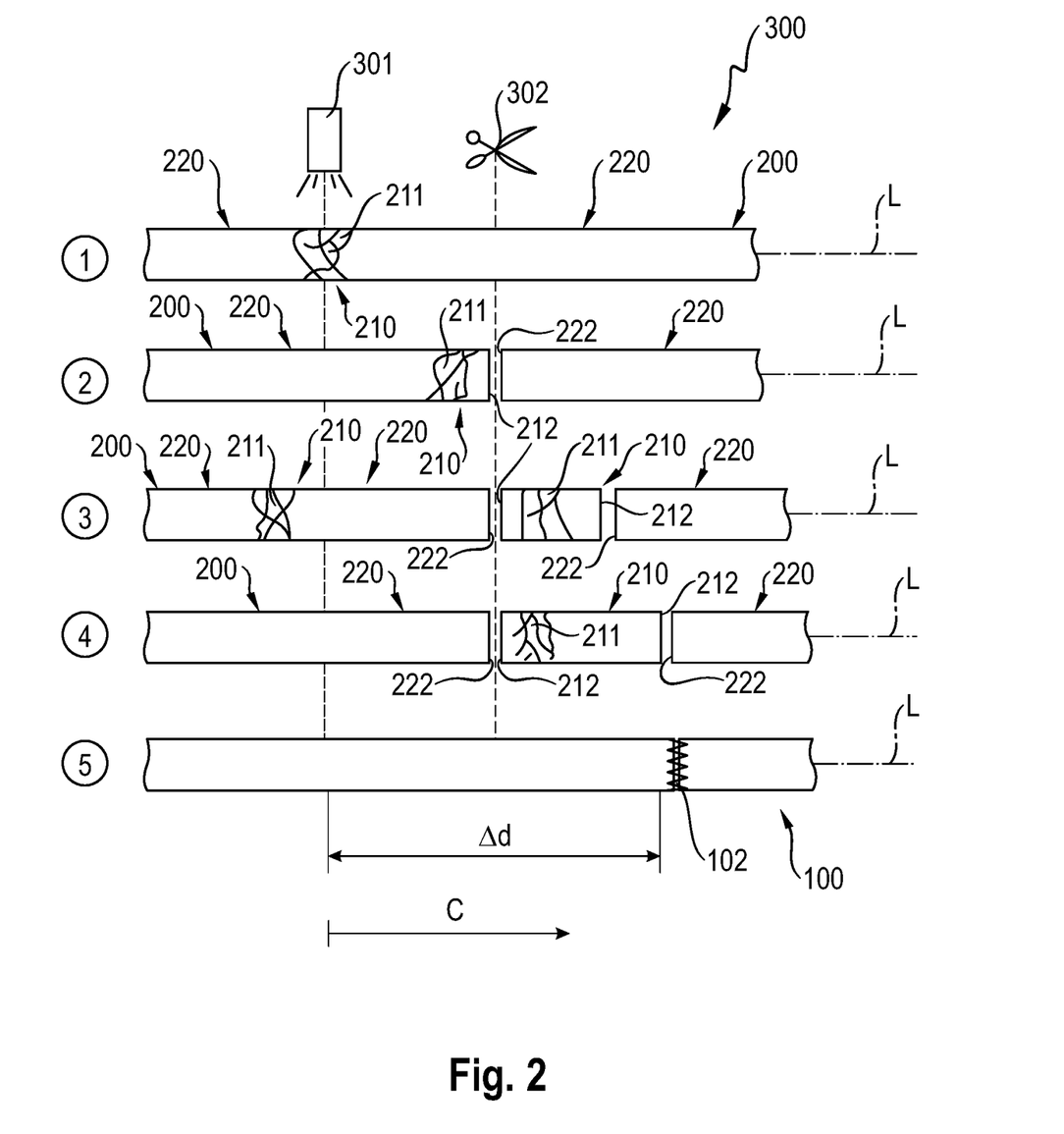
FIG. 2 represents a graphical illustration of the method sequence.

FIG. 2 shows a graphical illustration of the method's sequence when cutting out the first segments 210 from the extruded strand 200. The first segments 210 are those segments of the extruded strand 200 that comprise manufacturing defects 211 whereas the second segments 220 are free from manufacturing defects 211.

A manufacturing defect 211 may be any defect of the extruded strand 200 that occurs during manufacture of the extruded strand 200, particularly an extrusion defect. Manufacturing defects 211 usually lead to functional and/or optical impairments. Therefore, sealing or trim strips 120, 121 comprising manufacturing defects 211 must not be applied to windows or doors. As was mentioned before, joints 102 are not considered to be manufacturing defects 211 for the purpose of the present invention.

As can be seen in FIG. 2, a manufacture environment 300 comprises a testing position 301 and a stamping position 302. An extruded strand 200 is conveyed in the manufacture environment 300 along a conveying direction C. The stamping position 302 is arranged along the conveying direction C behind the testing position 301. Hence, the extruded strand 200 is tested first to detect possible manufacturing defects 211 before it reaches the stamping position 302.

In FIG. 2, condition (1), the extruded strand 200 comprises second segments 220 and a first segment 210, the first segment 210 comprising manufacturing defects 211. In condition (1), the first segment 210 with manufacturing defects 211 is just passing the testing position 301, and the manufacturing defects 211 are detected at the testing position 301.

In condition (2), the extruded strand 200 has been further conveyed along the conveying direction C so that the first segment 210 is about to pass the stamping position 302. At this time, a first stamping is performed so as to separate the first segment 210 comprising the manufacturing defects 211 from the preceding second segment 220.

In condition (3), the first segment 210 comprising the manufacturing defects 211 is also separated from the succeeding second segment 220 as a second stamping is performed shortly after the first segment 210 has passed the stamping position 302. Hence, the first segment 210 is cut out from the extruded strand 200 and can be wasted or recycled. By performing the stamping actions, cut faces 222 remain at the second segments 220 and also at the first segment 210.

In condition (3), it is apparent that the segment following the first segment 210 in the conveying direction C, hereafter referred to as the succeeding segment, consists of a second segment 220 followed by a first segment 210 comprising manufacturing defects 211. It is also apparent that the distance between the cut face 222 of the succeeding segment and the first segment 210 is less than the minimum distance Δd that is to be maintained between the positions of adjacent joints 102. Put differently, the second segment 220 of the succeeding segment is too short to form a sealing strip or a trim strip.

Therefore, in condition (4), the second segment 220 is again cut out from the extruded strand 200 as soon as the first segment 210 has passed the stamping position 302. Again, the first segment 210 can be wasted or recycled.

As can be seen in condition (5), the succeeding second segment 220 is longer than the minimum distance Δd that is to be maintained between the positions of adjacent joints 102. It is shown that the two second segments 220 that are free from manufacturing defects are joined to form a material strand 100.

In other possible configurations, the manufacture environment can include more than one stamping position 302 for performing the first and second stampings and/or the stamping position 302 is variable, i. e. the stamping means is capable of changing its position along the conveying direction C.

By the method's sequence described in FIG. 2, the material waste can be considerably reduced due to the fact that there is no need to waste entire strips, if they comprise manufacturing defects, but the length of those segments comprising manufacturing defects that are cut out and wasted varies with the occurrence of manufacturing defects. In most cases, only a short segment will need to be cut out from the extruded strand 200. It is only necessary in few cases, namely if the distance between a cut face 212 and the next manufacturing defect is less than the minimum distance Δd between adjacent joints 102, to cut out a longer part from the extruded strand 200.

Figure 3:
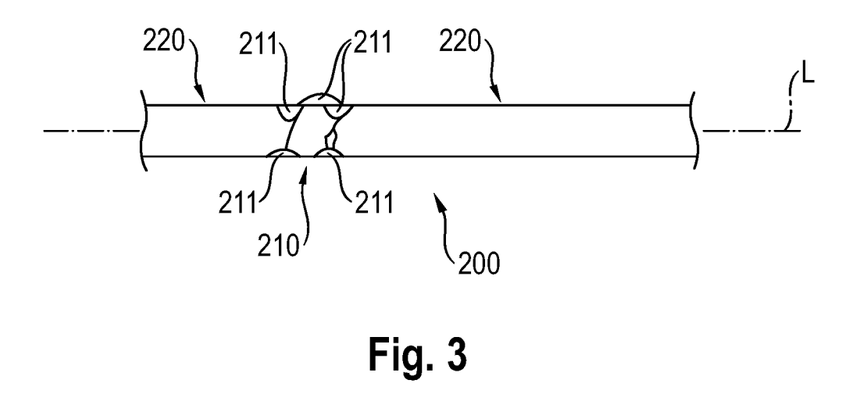
FIG. 3 is a side view of an arbitrary part of an extruded strand having manufacturing defects.
Figure 4:
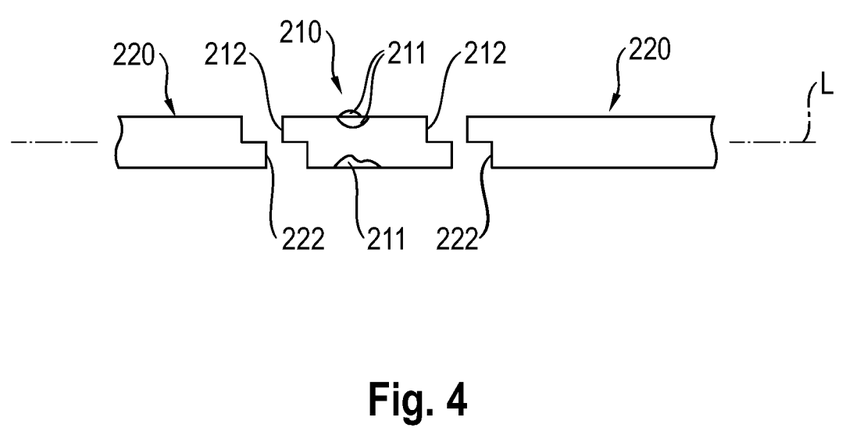
FIG. 4 is a side view of the arbitrary part of an extruded strand from FIG. 3, wherein the first segment is cut out from the extruded strand.
Figure 5:
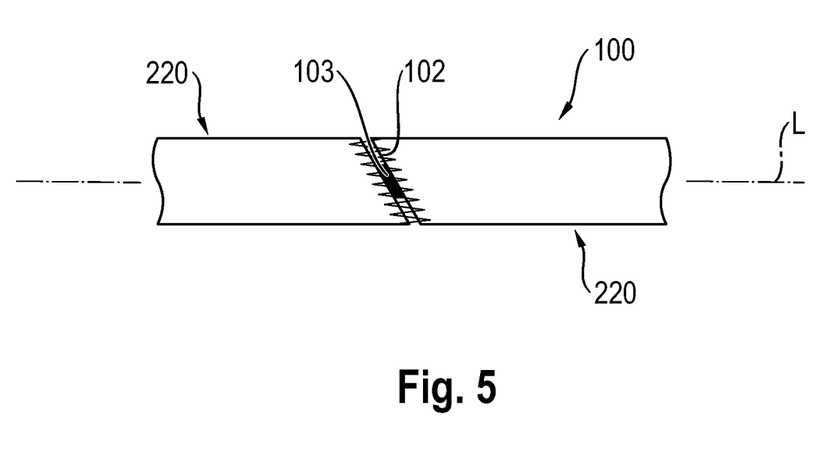
FIG. 5 is a side view of an arbitrary part of a material strand having a joint.

FIGS. 3 to 5 show side views of extruded strands 200 or material strand 100, depending on the stage of the method. In FIG. 3, an arbitrary part of an extruded strand 200 is shown. The part of the extruded strand 200 consists of a first segment 210 and of second segments 220. The first segment 210 comprises manufacturing defects 211, whereas the second segments 220 are free from manufacturing defects.

Referring now to FIG. 4, it is shown the arbitrary part of an extruded strand 200 from FIG. 3. In the meantime, the first segment 210 has been cut out from the extruded strand 200. By cutting out the first segment 210 from the extruded strand 200, the second segments 220 as well as the first segment 210 have obtained cut faces 212, 222 at the respective cutting points.

As is evident from FIG. 4, the cut faces 212, 222 have complementary shapes. In the present embodiment shown in FIG. 4, they have stepped shapes so as to ensure a corresponding orientation around the strand's longitudinal axis L. However, the shape of the cut faces 212, 222 can also be, for example, oblique, convex, or concave. The first segment 210 cut out from the extruded strand 200 can be wasted or recycled in any way, if applicable.

FIG. 5 shows an arbitrary part of a material strand 100 after joining two second segments 220. The two second segments 220 are joined with each other via a joint 102. In the present exemplary embodiment, the second segments 220 are sewn to one another. However, the joint 102 can also be produced in most different other ways, such as adhering or welding. In this exemplary embodiment, the cut faces 222 of the second segments 220 are oblique to the longitudinal axis L of the material strand 100.

In FIG. 5 it is shown that a metal marker 103 is interposed between the two second segments 220. The metal marker 103 serves as an identification means so that the position of a joint 102 can easily be identified when processing the material strand. For example, the position of the metal marker 103 can be identified by a metal detector. In another possible configuration, the seam forming the joint 102 between second segments 220 is made of metal so that the seam fulfils both the function of joining the second segments 220 and the function of identifying the joint 102 at the same time.

It is also possible to choose other types of identification means. For example, the joint 102 can be identified visually by applying a paint at or near the joint 102. Also, a radiocommunication member, such as a Near Field Communication-chip (NFC-chip) may be disposed at or near the joint 102 so as to be readable by a radiocommunication device.

In FIG. 5, the identification means, i. e. the metal marker 103, is interposed between the two second segments 220 before joining them. However, the identification means can also be disposed close to the joint 102 of the second segments 220, but not therebetween.

Figure 6:
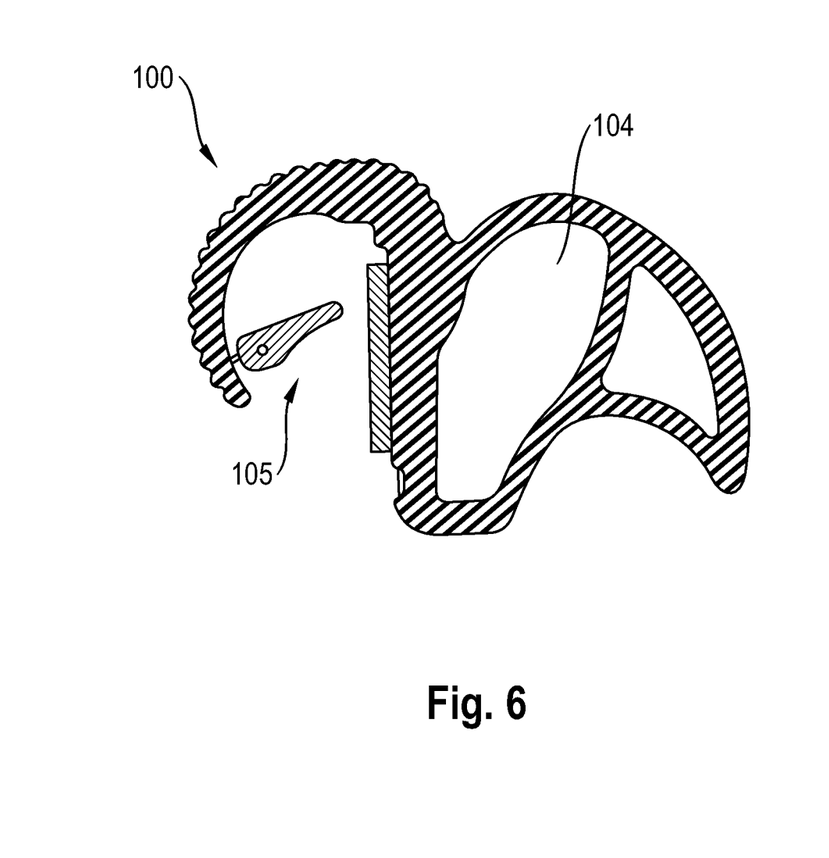
FIG. 6 is a cross-sectional view of the profile strand.

Referring now to FIG. 6, it is shown a cross-sectional view of the material strand 100. The material strand 100 comprises a function portion and a fastening portion 105. The function portion is a hollow chamber 104. The fastening portion 105 is configured to receive a flange of the door 11 or the window 12 of the automotive vehicle 10. With regard to a detailed description of the fastening portion's 105 functionality, it is referred to DE 10 2006 060 391 C5.

Figure 7:
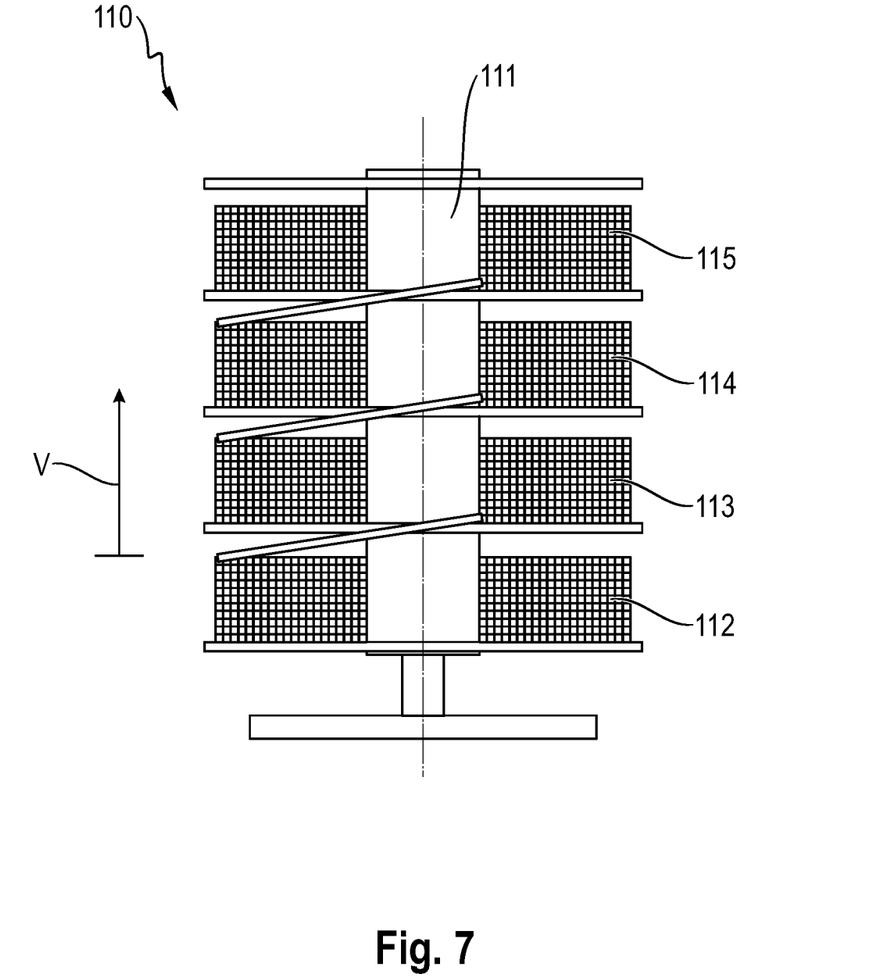
FIG. 7 is a cross-sectional view of the profile strand, wherein the hollow chamber is folded open.

In FIG. 7, there is shown a transport unit 110 comprising a plurality of receiving devices 112, 113, 114, 115. Each of the receiving devices 112, 113, 114, 115 has a reel 111 and each reel 111 extends in a vertical direction V. Each receiving device 112, 113, 114, 115 is configured to receive a material strand 100 around the reel 111 so that the material strand 100 can be wound around a vertical axis. The receiving devices 112, 113, 114, 115 are stackable one onto another, as is shown in FIG. 7. This ensures that the transport of the material strand 100 is space-saving and inexpensive.

A transport unit 110 can comprise a single receiving device 112, 113, 114, 115, or it can comprise a plurality of receiving devices 112, 113, 114, 115 stacked onto one another. If the transport unit 110 comprises a plurality of receiving devices 112, 113, 114, 115, the material strand 100 can be continuously wound around the reels 111 of more than only one receiving device 112, 113, 114, 115 without there being a need to disconnect the material strand 100. In other configurations, the reel 111 can extend in a horizontal direction so that the material strand 100 is wound around a horizontal axis.

LIST OF REFERENCE SIGNS

| | |
|---|---|
| 10 | motor vehicle |
| 11 | door |
| 12 | window |
| 100 | material strand |
| 102 | joint |
| 103 | metal marker |
| 104 | hollow chamber |
| 105 | fastening portion |
| 110 | transport unit |
| 111 | reel |
| 112 | receiving device |
| 113 | receiving device |
| 114 | receiving device |
| 115 | receiving device |
| 120 | sealing strip |
| 121 | trim strip |
| 200 | extruded strand |

| | |
|---|---|
| 210 | first segment |
| 211 | manufacturing defect |
| 212 | cut face |
| 220 | second segment |
| 222 | cut face |
| 300 | manufacture environment |
| 301 | testing position |
| 302 | stamping position |
| Δd | minimum distance |
| C | conveying direction |
| L | longitudinal axis |
| V | vertical direction |

The invention claimed is:

1. A method of manufacturing a material strand for sealing, trimming or fastening of doors or windows of a motor vehicle, the method comprising the steps of:
   a) extrusion of an extruded strand;
   b) prior to forming a transport unit, testing the extruded strand after the extrusion, thereby identifying first segments comprising manufacturing defects and second segments being free from manufacturing defects;
   c) prior to forming the transport unit, cutting out the first segments from the extruded strand, thereby causing cut faces at the second segments;
   d) prior to forming the transport unit, cutting out the second segments from the extruded strand which have a length less than a predetermined minimum distance (Δd), the minimum distance (Δd) being long enough to form a sealing strip or a trim strip;
   e) prior to forming the transport unit, joining cut faces of second segments which have a length equal to or longer than the minimum distance (Δd) to obtain a joint and to form a material strand, the joint having a position within the material strand, wherein the minimum distance (Δd) is maintained between the positions of adjacent joints;
   f) prior to forming the transport unit, identifying the position of each joint; and
   g) forming the transport unit having a predetermined maximum length by winding the material strand.

2. The method according to claim 1, wherein the extruded strand is conveyed along a conveying direction (C), wherein in step b), the extruded strand is tested at a testing position along the conveying direction (C).

3. The method according to claim 2, wherein in step c), the first segments are cut out at a stamping position, the stamping position being arranged along the conveying direction (C) behind the testing position.

4. The method according to claim 3, wherein in step c), the first segments are cut out by stamping, wherein a first stamping is performed prior to a first segment passing the stamping position and a second stamping is performed after the first segment has passed the stamping position.

5. The method according to claim 3, wherein the cut faces to be joined in step e) are formed so as to have complementary shapes.

6. The method according to claim 3, wherein the minimum distance (Δd) is between about 5 m and about 15 m.

7. The method according to claim 2, wherein in step g), the transport unit of the material strand is formed by winding the material strand onto a reel.

8. The method according to claim 1, wherein the cut faces to be joined in step e) are formed so as to have complementary shapes.

9. The method according to claim 8, wherein the cut faces have a stepped shape.

10. The method according to claim 8, wherein in step e), the second segments are joined by welding or sewing or adhering.

11. The method according to claim 8, wherein in step f), the position of each joint is identified by storing the position.

12. The method according to claim 1, wherein in step e), the second segments are joined by welding or sewing or adhering.

13. The method according to claim 1, wherein in step f), the position of each joint is identified by at least one of:
   a metal marker disposed at or near the cut faces of the joint,
   a paint applied at or near the cut faces of the joint,
   a radiocommunication member disposed at or near the cut faces of the joint, and
   a plastic marker disposed at or near the cut faces of the joint or by a metal seam.

14. The method according to claim 1, wherein in step f), the position of each joint is identified by storing the position, and wherein the position is stored on a data storage medium.

15. The method according to claim 1, wherein in step g), the transport unit of the material strand is formed by winding the material strand onto a reel.

16. The method according to claim 1, wherein the minimum distance (Δd) is between about 5 m and about 15 m.

17. The method according to claim 16, wherein the minimum distance (Δd) is between about 8 m and about 12 m.

18. The method according to claim 1, wherein the maximum length is between about 800 m and about 2000 m.

19. The method according to claim 18, wherein the maximum length is between about 1000 m and about 1600 m.

20. The method according to claim 18, wherein the maximum length is about 1400 m.

* * * * *